United States Patent
Branciforte et al.

(10) Patent No.: US 10,673,316 B2
(45) Date of Patent: Jun. 2, 2020

(54) OUTPUT ADJUSTMENT CIRCUIT FOR POWER CONVERTERS, CORRESPONDING DEVICE, AND METHOD

(71) Applicant: STMicroelectronics S.r.l., Agrate Brianza (IT)

(72) Inventors: Marco Maria Branciforte, Catania (IT); Filippo Bonaccorso, Catania (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/373,309

(22) Filed: Apr. 2, 2019

(65) Prior Publication Data
US 2019/0326809 A1 Oct. 24, 2019

(30) Foreign Application Priority Data
Apr. 18, 2018 (IT) .................. 102018000004680

(51) Int. Cl.
*H02M 1/08* (2006.01)
*H02M 1/00* (2006.01)

(52) U.S. Cl.
CPC ...... *H02M 1/08* (2013.01); *H02M 2001/0025* (2013.01)

(58) Field of Classification Search
CPC .......... H02M 1/08; H02M 1/32; H02M 3/335; H02M 3/33507; H02M 3/33515; H02M 3/33523; H02M 3/33576; H02M 3/156–158; H02M 3/1584; H02M 3/1588; H02M 2001/0025; H02M 2001/0032; Y02B 70/1466

USPC ..... 363/21.12–21.15, 89, 142; 323/234, 271, 323/282–285
See application file for complete search history.

(56) References Cited

U.S. PATENT DOCUMENTS

| | | | | |
|---|---|---|---|---|
| 6,552,517 B1* | 4/2003 | Ribellino | ................ | H02M 1/36 323/282 |
| 2007/0080673 A1* | 4/2007 | Seliverstov | ............... | G06F 1/26 323/282 |
| 2008/0157730 A1* | 7/2008 | Kim | ...................... | G11C 5/145 323/234 |
| 2014/0177303 A1* | 6/2014 | Goerke | ............ | H02M 3/33507 363/89 |
| 2016/0149492 A1* | 5/2016 | Huang | .................. | H02M 3/156 323/271 |

FOREIGN PATENT DOCUMENTS

EP 2571152 A1 9/2011

* cited by examiner

*Primary Examiner* — Yemane Mehari
(74) *Attorney, Agent, or Firm* — Slater Matsil, LLP

(57) ABSTRACT

A circuit includes a power converter including an output node and a feedback port, which is configured to receive a feedback signal to control the output signal at the output node. The circuit further includes a feedback network coupled to both the output node and the feedback port of the power converter. The feedback network includes a combined voltage divider. The combined voltage divider includes a first branch and a second branch. The first branch is coupled between the output node of the power converter and a partition node coupled to the feedback port of the power converter. The second branch is coupled between the partition node and a ground voltage. The second branch of the combined voltage divider includes a modulation node between the partition node and the ground voltage.

20 Claims, 2 Drawing Sheets

OUTPUT ADJUSTMENT CIRCUIT FOR POWER CONVERTERS, CORRESPONDING DEVICE, AND METHOD

CROSS-REFERENCE TO RELATED APPLICATIONS

This application claims priority to Italian Patent Application No. 102018000004680, filed on Apr. 18, 2018, which application is hereby incorporated herein by reference.

TECHNICAL FIELD

The present invention relates generally to power converters, and, in particular embodiments, to output adjustment circuits for power converters

BACKGROUND

Various power conversion systems, such as alternating current (AC) to direct current (DC) converters (AC/DC converters) and DC to DC converters (DC/DC converters), include as a desirable feature the ability to control and change the output voltage value dynamically. That ability may be exploited, for instance, for implementing cable-drop-compensation.

Various solutions already proposed to provide such a desirable feature exhibit a number of drawbacks such as, for instance, a certain complexity and/or a marked dependency of the output voltage resolution on the accuracy of a digital-to-analog converter (DAC) included in the arrangement.

SUMMARY

One or more embodiments can contribute in providing improved solutions overcoming the drawbacks of such conventional solutions.

One or more embodiments may rely on the underlying concept of controlling a feedback input point of the converter by applying, on a resistive voltage divider, a PWM signal provided, for instance, by a microcontroller or other device.

One or more embodiments an output pin providing such PWM signal may adopt an open drain configuration.

In accordance with an embodiment of the invention, a circuit includes a power converter including an output node and a feedback port. The output node is configured to provide an output signal. The feedback port is configured to receive a feedback signal to control the output signal at the output node. The circuit further comprises a feedback network coupled to both the output node and the feedback port of the power converter. The feedback network includes a combined voltage divider. The combined voltage divider includes a first branch and a second branch. The first branch is coupled between the output node of the power converter and a partition node coupled to the feedback port of the power converter. The second branch is coupled between the partition node and a ground voltage. The second branch of the combined voltage divider includes a modulation node between the partition node and the ground voltage. The modulation node is configured to receive a pulse width modulation (PWM) modulated control signal.

In accordance with another embodiment of the invention, a device includes a power converter and a feedback network. The power converter includes an output node configured to provide an output signal, and a feedback port configured to receive a feedback signal to control the output signal at the output node. The feedback network is coupled to the output node and the feedback port of the power converter. The feedback network includes a combined voltage divider. The combined voltage divider includes a first branch and a second branch. The first branch is coupled between the output node of the power converter and a partition node coupled to the feedback port of the power converter. The second branch is coupled between the partition node and a ground voltage. The second branch of the combined voltage divider includes a modulation node between the partition node and the ground voltage. The modulation node is configured to receive a pulse width modulation (PWM) modulated control signal. The modulation node is switchable by the PWM modulated control signal between a floating state and a grounded state. The device further includes a PWM modulator circuit block coupled to the modulation node. The PWM modulator circuit block is controllable to bring the modulation node alternatively to the floating state and to the grounded state. The output signal at the output node of the power converter is a function of a duty cycle of the PWM modulator circuit block.

In accordance with still another embodiment of the invention, a method of operating a circuit includes addressing a first voltage divider generating a minimum voltage using the first voltage divider. The addressing the first voltage divider is performed by generating a first signal at a modulation node using a pulse width modulation (PWM) modulator. The first signal includes an ON state. The method further includes addressing a second voltage divider generating a maximum voltage using the second voltage divider. The addressing the second voltage divider is performed by generating a second signal at the modulation node using the PWM modulator. The second signal includes an OFF state.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

Figure 1:
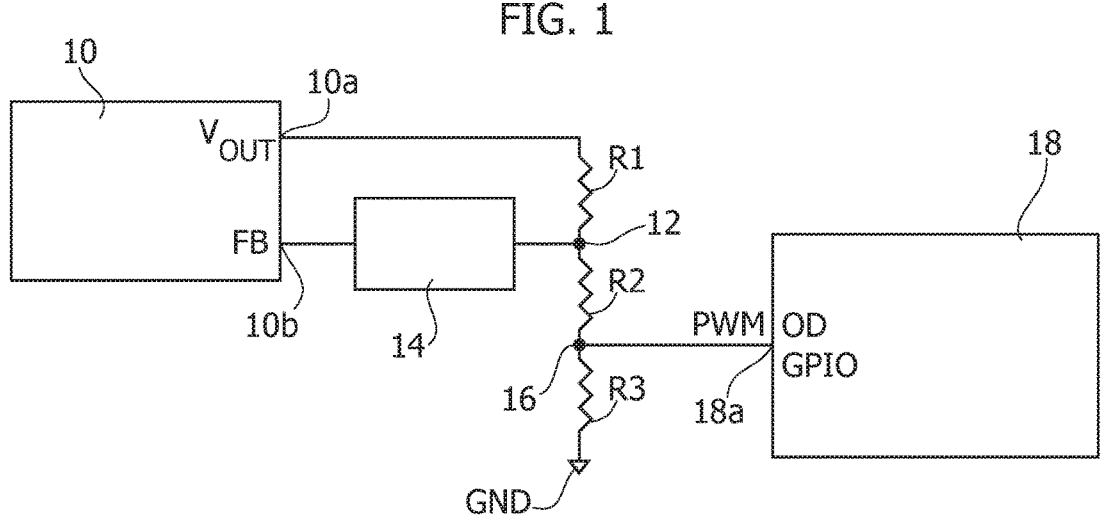
FIG. 1 is a block diagram exemplary of possible embodiments.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. More-over, particular conformations, structures, or characteristics may be combined in any adequate way in one or more embodiments.

The references used herein are provided merely for convenience and hence do not define the extent of protection or the scope of the embodiments.

Various solutions already proposed to provide desirable features such as the ability to control and change the output voltage value exhibit a number of drawbacks such as, for instance, a certain complexity and/or a marked dependency of the output voltage resolution on the accuracy of a digital-to-analog converter (DAC) included in the arrangement.

One or more embodiments as described in the following can be applied, for instance, to AC/DC or DC/DC converters for use in a variety of sectors. Battery chargers for electronic devices, USB power delivery (USB-PD) arrangements, adapters are non-limiting examples of such applications.

An objective of one or more embodiments is to contribute in providing improved solutions overcoming the drawbacks of conventional solutions.

One or more embodiments may include the underlying concept of controlling a feedback input point of a converter by applying, on a resistive voltage divider, a pulse width modulation (PWM) signal provided, for instance, by a microcontroller or other device.

One or more embodiments including an output pin providing such a PWM signal may adopt an open drain configuration.

A conventional power converter may include a conventional feedback network including a resistive voltage divider. Acting on this divider facilitates controlling the output signal $V_{out}$ (e.g., controlling the voltage). A recognized underlying problem of such a solution lies in that allowing for a wide range of possible variation in the output signal (both as a finite set of possible voltage values and as a continuous range of variation) may result in an increased circuit complexity as well as in high bill of material (BoM) cost.

For instance, certain conventional systems are configured to dynamically adjust the output voltage by moving the feedback point using a current generator or DAC (which may be approximated by means of a PWM signal filtered by an RC stage). As noted, these solutions may exhibit a number of drawbacks such as, for instance, a certain complexity and/or a marked dependency of the output voltage resolution on the accuracy of a digital-to-analog converter (DAC) included in the arrangement.

FIG. 1 illustrates a schematic circuit diagram of an example output adjustment circuit exemplary of possible embodiments of the invention.

In the schematic circuit diagram of FIG. 1, a power converter 10 includes an output node boa configured to provide an output (e.g., a voltage) signal $V_{out}$, and a feedback port bob configured to receive a feedback signal FB to control the output signal $V_{out}$ at the output node boa. Such an arrangement may be used, for instance, in AC/DC or DC/DC converters for use in a variety of sectors. A feedback network may be included in a converter to couple the output node boa to the feedback port bob.

In contrast to the conventional feedback network described above, in one or more embodiments as exemplified herein, a feedback network coupled between the output node boa and the feedback port bob of the converter may comprise a voltage divider including, for instance, three resistors R1, R2 and R3.

In one or more embodiments as exemplified herein, such a resistive voltage divider may comprise a first branch (for instance, the resistor R1) arranged between the output node boa of the power converter 10 and a partition node 12 coupled to the feedback port bob of the power converter 10. This latter coupling may be via a low-pass filter 14 (see, for instance, FIGS. 1 and 2) or via a direct connection (see, for instance, FIG. 3).

In one or more embodiments as exemplified herein, the voltage divider may comprise a second branch (for instance the resistors R2, R3) between the partition node 12 and ground GND.

In one or more embodiments as exemplified herein, the second branch of the voltage divider may comprise a modulation node 16 between the partition node 12 and ground GND (for instance, with the modulation node 16 between the resistors R2 and R3).

In one or more embodiments as exemplified herein, the modulation node 16 is configured to receive a PWM modulated control signal as provided, for instance, by a microcontroller or another device 18 adapted for that purpose, for instance by being provided with a corresponding modulator block output node. For example, the modulator block output node may be a general purpose input/output (GPIO) interface/node, optionally of the OD (open drain) type.

In one or more embodiments as exemplified herein, the modulation node 16 may thus be alternatively brought (switched) to a floating ("high") state and a grounded ("low") state.

Figure 2:
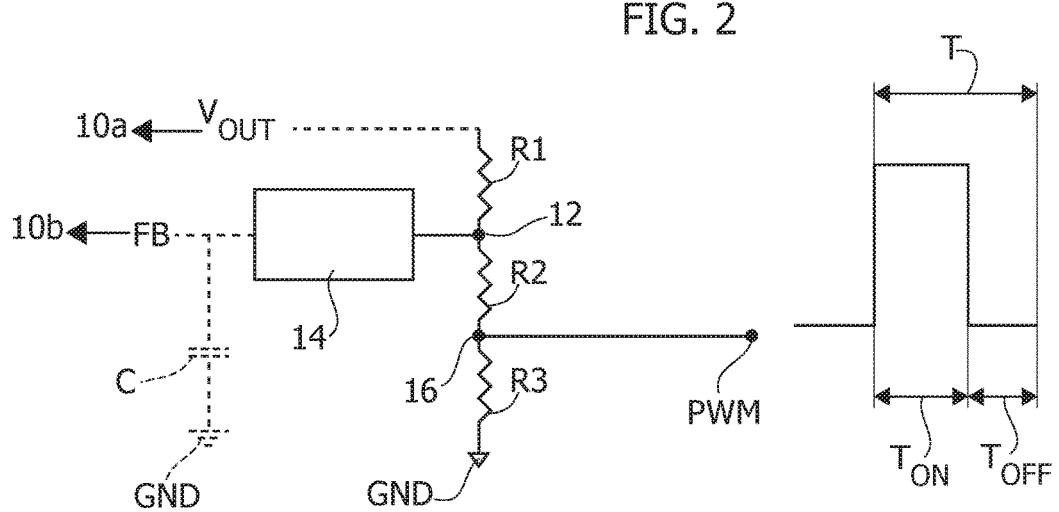
FIG. 2 is a functional-diagram exemplary of embodiments.

As exemplified in FIG. 2, the device 18 may be configured (in a manner known per se) to alternatively bring the modulation node 16 to the floating state and to the grounded state (GND) over the $T_{ON}$ and $T_{OFF}$ intervals of a PWM signal of period T, the ratio $T_{ON}/(T_{ON}+T_{OFF})$ representing the duty-cycle of the PWM signal.

FIG. 2 illustrates a schematic circuit diagram of an example an example output adjustment circuit exemplary of possible embodiments of the invention.

As exemplified in FIG. 2, in one or more embodiments, due to a possible open drain (OD) configuration:

with the PWM signal in the ON state or phase ($T_{ON}$), the device 18 exposes the modulation node 16 to a high impedance, for instance due to an internal MOS coupled to the modulator block output node 18a being non-conductive (turned off);

with the PWM signal in the OFF state or phase ($T_{OFF}$), the device 18 couples the modulation node 16 to ground GND, for instance due to the internal MOS coupled to the modulator block output node 18a being conductive (turned on).

As exemplified in FIG. 2, the PWM signal may thus be regarded as "addressing" two different (resistive) voltage dividers:

R1 and (R2+R3) as a result of the PWM signal being in the ON state or phase ($T_{ON}$);

R1 and R2 as a result of the PWM signal being in the OFF state or phase ($T_{OFF}$).

Relying on the operating principle just discussed, in one or more embodiments the resistance values of the resistors R1, R2 and R3 can be selected to obtain desired upper and lower values of the output voltage $V_{out}$ (namely $V_{outmax}$ and $V_{outmin}$) with the PWM signal in the OFF and ON state or phase, respectively:

$$\text{PWM ON phase} \rightarrow V_{outmin} = V_{FB} \frac{R1(R2 + R3)}{R2 + R3}$$

-continued $$\text{PWM OFF phase} \rightarrow V_{outmax} = V_{FB}\frac{R1 \times R2}{R2}$$

By leaving aside for simplicity the action of the low-pass filter 14, the following expressions will apply for the feedback (voltage) signal VFB at the feedback port 10*b*:

$$\text{PWM ON phase} \rightarrow V_{FB} = V_{out}\frac{R2+R3}{R1(R2+R3)}$$

$$\text{PWM OFF phase} \rightarrow V_{FB} = V_{out}\frac{R2}{R1 \times R2}$$

By taking into account the (averaging) action of the low-pass filter 14 and/or by assuming that the frequency of the PWM signal is sufficiently higher than the band of the low-pass filter, the following holds:

$$V_{FB} = V_{out}\frac{R2+R3}{R1(R2+R3)}DutyCycle + V_{out}\frac{R2}{R1 \times R2}(1 - DutyCycle)$$

where DutyCycle denotes the duty-cycle $T_{ON}/(T_{ON}+T_{OFF})$ of the PWM signal applied to the modulation node 16.

Consequently the value $V_{out}$ will be linearly dependent on the value of DutyCycle:

$$V_{out} = V_{outmin} \cdot DutyCycle + V_{outmax} \cdot (1-DutyCycle)$$

It will be otherwise appreciated that the low-pass/averaging action here exemplified by a distinct element such as the low-pass filter 14 coupling the partition node 12 to the feedback port 10*b* may be otherwise provided by a control loop network associated (for instance as an external network between the partition node 12 and the feedback port 10*b*) with the power converter 10 starting from the feedback port 10*b*.

A capacitor C can be possibly coupled between the partition node 12 and ground GND to (further) reduce the band of the low-pass filter and enhance the associated average action. For example, as shown in FIG. 2, a capacitor C may have a first end coupled between the feedback port 10*b* and the low-pass filter 14 and a second end coupled to ground GND.

The value for DutyCycle in the previous formulas is adapted to be varied between 0 (PWM always OFF) and 1 (PWM always ON), that ranges from 0% to 100%.

One or more embodiments as exemplified herein are adapted to be applied in the feedback loop of various commercial AC/DC stages. An AC/DC converter implemented with an integrated circuit (IC) available under the designation STCH03 IC is exemplary of such a stage.

Figure 3:
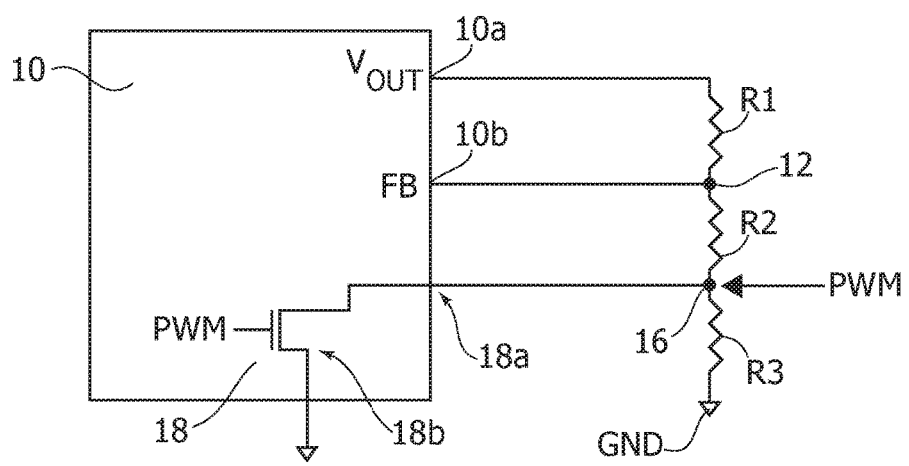
FIG. 3 is a block diagram exemplary of embodiments.

FIG. 3 illustrates a schematic circuit diagram of an example an example output adjustment circuit exemplary of possible embodiments of the invention.

One or more embodiments as exemplified herein may comprise a PWM generator integrated in the power converter 10.

FIG. 3 is exemplary of such a PWM generator including, for instance, a transistor 18*b* such as an NMOS transistor integrated in the power converter 10 and configured to provide a PWM signal as discussed previously at the modulator block output node 18*a*.

The transistor 18*b* may thus provide the "internal" MOS transistor configured to expose the modulation node 16 to a high impedance with PWM signal in the ON state or phase ($T_{ON}$) or to couple the modulation node 16 to ground GND with the PWM signal in the OFF state or phase ($T_{OFF}$).

Figure 4:
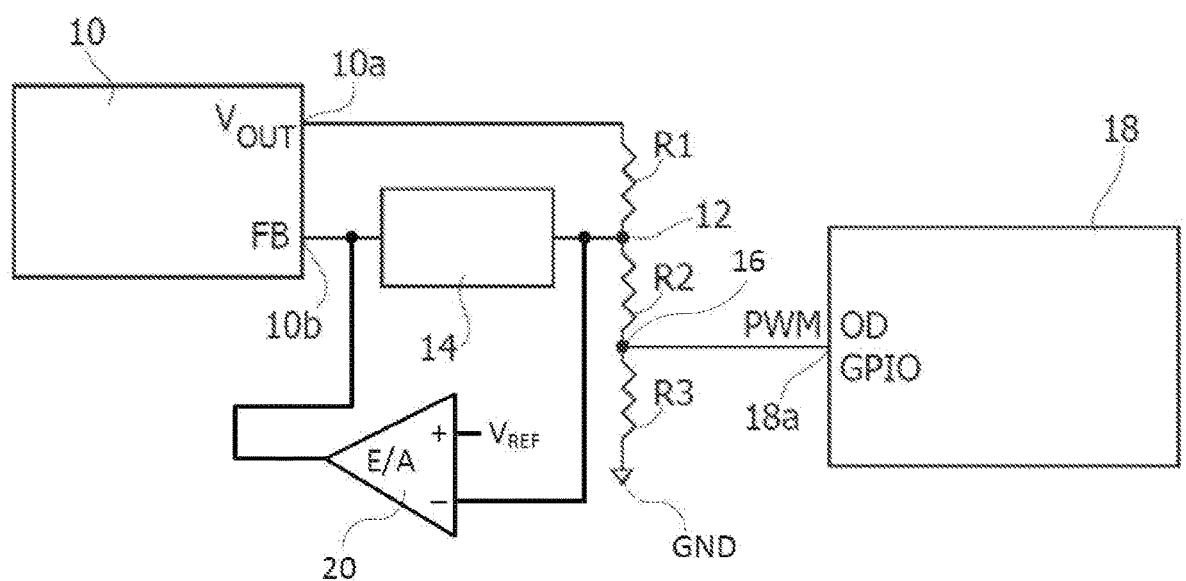
FIG. 4 illustrates a schematic circuit diagram of an example output adjustment circuit exemplary of possible embodiments of the invention.

FIG. 4 illustrates a schematic circuit diagram of an example output adjustment circuit exemplary of possible embodiments of the invention As shown in the schematic circuit diagram of FIG. 4, an error amplifier 20 may be included to compare the voltage at partition node 12 with a reference voltage $V_{REF}$ (e.g. 0.6 V). The error amplifier 20 may be a voltage mode operational amplifier having high DC gain and low output impedance.

A circuit according to one or more embodiments may comprise a power converter (e.g., 10) having an output node (e.g., ma) configured to provide an output signal (e.g., Vout) and a feedback port (e.g., 10*b*) configured to receive a feedback signal (e.g., FB) to control the output signal at the output node. A feedback network (e.g., R1, R2, R3, 14) is coupled to the output node and the feedback port of the power converter. The feedback network comprises a voltage divider that includes a first branch (e.g., R1) between the output node of the power converter and a partition node (e.g., 12) coupled (e.g., 14) to the feedback port of the power converter and a second branch (e.g., R2, R3) between the partition node and ground. The second branch of the voltage divider comprises a modulation node (e.g., 16) intermediate the partition node and ground. The modulation node (e.g., 16) is configured to receive a PWM modulated control signal. The modulation node is switchable by the PWM modulated control signal between a floating state (e.g., TON) and a grounded state (e.g., TOFF).

In one or more embodiments, the feedback network may comprise a resistive voltage divider comprising resistive first and second branches.

In one or more embodiments, the voltage divider may comprise, between the output node of the power converter and ground, a cascaded arrangement of a first resistor, a second resistor and a third resistor, the first resistor arranged between the output node of the power converter and the partition node, the second resistor and third resistor arranged between the partition node and ground with the modulation node between the second resistor and the third resistor.

One or more embodiments may comprise a low-pass filter path coupled to the feedback port of the power converter, as provided e.g. by a low-pass filter (e.g. 14) coupling the partition node to the feedback port or by an (external) network between the node 12 and the port 10*b*.

A device according to one or more embodiments may comprise a circuit according to one or more embodiments, and a PWM modulator circuit block (e.g., 18) coupled to the modulation node. The PWM modulator circuit block is controllable to bring the modulation node alternatively to a floating state and to a grounded state. The output signal at the output node of the power converter is a function of the duty cycle of the PWM modulator circuit block.

In one or more embodiments the PWM modulator circuit block may comprise an output node (e.g., 18*a*) coupled to the modulation node. The output node of the PWM modulator circuit block switchable to a high impedance state to switch the modulation node to the floating state.

One or more embodiments may comprise the PWM modulator circuit block integrated in the power converter.

A method of operating a circuit according to one or more embodiments may comprise alternatively bringing the modulation node to a floating state and to a grounded state.

Without prejudice to the underlying principles, the details and embodiments may vary, even significantly, with respect to what has been described by way of example only, without departing from the extent of protection. The extent of protection is determined by the annexed claims.

What is claimed is:

1. A circuit, comprising:
a power converter comprising an output node configured to provide an output signal, and a feedback port configured to receive a feedback signal to control the output signal at the output node; and
a feedback network coupled to both the output node and the feedback port of the power converter, wherein the feedback network comprises a combined voltage divider;
wherein the combined voltage divider comprises a first branch coupled between the output node of the power converter and a partition node coupled to the feedback port of the power converter, and a second branch coupled between the partition node and a ground voltage;
wherein the second branch of the combined voltage divider comprises a modulation node between the partition node and the ground voltage, the modulation node configured to receive a pulse width modulation (PWM) modulated control signal; and
wherein the modulation node is switchable by the PWM modulated control signal between a floating state and a grounded state, the modulation node experiencing a high impedance with respect to a ground connection while in the floating state and experiencing a low impedance with respect to the ground connection while in the grounded state.

2. The circuit of claim 1, wherein:
the feedback network comprises a resistive voltage divider;
the first branch comprises a first resistive branch; and
the second branch comprises a second resistive branch.

3. The circuit of claim 1, wherein:
the combined voltage divider comprises a cascaded arrangement of a first resistor, a second resistor and a third resistor, the cascaded arrangement located between the output node of the power converter and the ground voltage,
the first resistor is coupled between the output node of the power converter and the partition node,
the second resistor and the third resistor are coupled between the partition node and the ground voltage, and
the modulation node is between the second resistor and the third resistor.

4. The circuit of claim 3, wherein:
the combined voltage divider comprises a first voltage divider and a second voltage divider;
the first resistor, the second resistor, and the third resistor form the first voltage divider; and
the first resistor and the second resistor form the second voltage divider.

5. The circuit of claim 3, wherein:
during the floating state, current through the combined voltage divider flows through the first resistor, the second resistor, and the third resistor; and
during the grounded state, current through the combined voltage divider flows through only the first resistor and the second resistor.

6. The circuit of claim 1, comprising a low-pass filter path coupled to the feedback port of the power converter.

7. The circuit of claim 6, further comprising a capacitor comprising a first end coupled to the feedback port and a second end coupled to the ground voltage.

8. The circuit of claim 1, wherein the circuit is an integrated circuit.

9. A device, comprising:
a power converter comprising an output node configured to provide an output signal, and a feedback port configured to receive a feedback signal to control the output signal at the output node;
a feedback network coupled to the output node and the feedback port of the power converter, wherein the feedback network comprises a combined voltage divider, the combined voltage divider comprising a first branch coupled between the output node of the power converter and a partition node coupled to the feedback port of the power converter and a second branch coupled between the partition node and a ground voltage, wherein
the second branch of the combined voltage divider comprises a modulation node between the partition node and the ground voltage, the modulation node configured to receive a pulse width modulation (PWM) modulated control signal, and
the modulation node is switchable by the PWM modulated control signal between a floating state and a grounded state; and
a PWM modulator circuit block comprising an output directly coupled to the modulation node, the PWM modulator circuit block being configured to generate the PWM modulated control signal at the output to bring the modulation node alternatively to the floating state and to the grounded state, wherein the output signal at the output node of the power converter is a function of a duty cycle of the PWM modulator circuit block.

10. The device of claim 9, wherein:
the feedback network comprises a resistive voltage divider;
the first branch comprises a first resistive branch; and
the second branch comprises a second resistive branch.

11. The device of claim 9, wherein the PWM modulator circuit block comprises a modulator block output node coupled to the modulation node, the modulator block output node being switchable to a high impedance state so that the modulation node is switched to the floating state.

12. The device of claim 9, wherein the PWM modulator circuit block is integrated in the power converter.

13. The device of claim 9, wherein:
the combined voltage divider comprises a cascaded arrangement of a first resistor, a second resistor and a third resistor, the cascaded arrangement located between the output node of the power converter and the ground voltage;
the first resistor is coupled between the output node of the power converter and the partition node;
the second resistor and the third resistor are coupled between the partition node and the ground voltage; and
the modulation node is between the second resistor and the third resistor.

14. The device of claim 13, wherein:
the combined voltage divider comprises a first voltage divider and a second voltage divider;
the first resistor, the second resistor, and the third resistor form the first voltage divider; and
the first resistor and the second resistor form the second voltage divider.

15. The device of claim 9, wherein the device is an alternating current to direct current (AC/DC) converter.

16. The device of claim 9, wherein the device is a direct current to direct current (DC/DC) converter.

17. A method of operating a circuit comprising:
addressing a first voltage divider by generating a first signal at a modulation node of the first voltage divider, using a pulse width modulation (PWM) modulator, the first signal comprising an ON state;
generating a minimum voltage using the first voltage divider;
addressing a second voltage divider by generating a second signal at the modulation node using the PWM modulator, the second signal comprising an OFF state; and
generating a maximum voltage using the second voltage divider.

18. The method of claim 17, wherein:
addressing the first voltage divider comprises bringing the modulation node to a floating state; and
addressing the second voltage divider comprises bringing the modulation node to a grounded state.

19. The method of claim 17, wherein:
addressing the first voltage divider comprises exposing the modulation node to a high impedance so that a first resistor, a second resistor, and a third resistor form the first voltage divider; and
addressing the second voltage divider comprises coupling the modulation node to a ground voltage so that the first resistor and the second resistor form the second voltage divider.

20. The method of claim 17, further comprising:
outputting an output voltage according to the minimum voltage, the maximum voltage, and a duty-cycle of the PWM modulator.

* * * * *